Nov. 5, 1963
A. V. SLACK ETAL
3,109,729
HIGH-ANALYSIS FERTILIZER SUSPENSIONS
Filed June 10, 1959
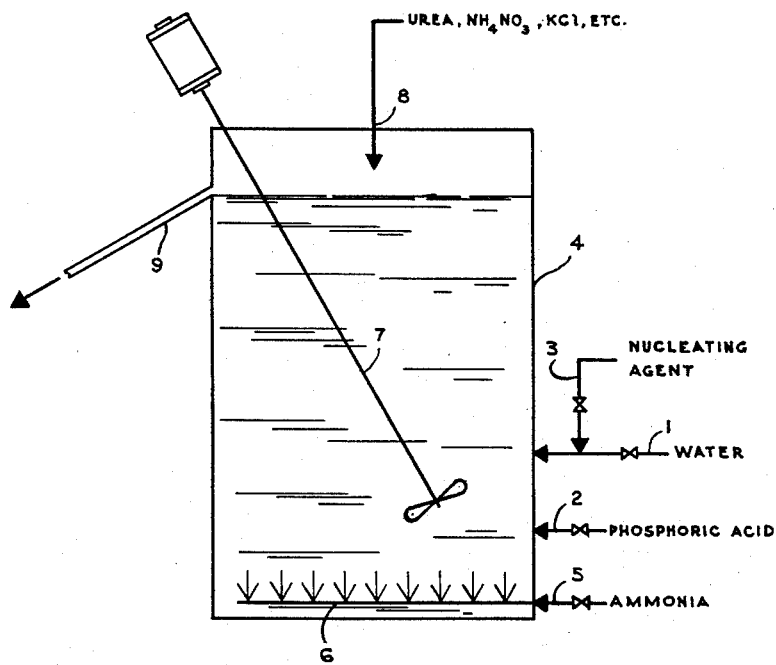
Archie V. Slack
John D. Hatfield
Henry K. Walters Jr. INVENTORS.
BY Bentley C Morriss
Attorney

United States Patent Office 3,109,729
Patented Nov. 5, 1963

3,109,729
HIGH-ANALYSIS FERTILIZER SUSPENSIONS
Archie V. Slack, Colbert County, and John D. Hatfield and Henry K. Walters, Jr., Florence, Ala., assignors to Tennessee Valley Authority, a corporation of the United States
Filed June 10, 1959, Ser. No. 819,516
4 Claims. (Cl. 71—42)
(Granted under Title 35, U.S. Code (1952), sec. 266)

This invention herein described may be manufactured and used by or for the Government for governmental purposes without the payment to us of any royalty therefor.

This invention is an improved process for the manufacture of high-analysis fertilizer suspensions.

The production and use of liquid fertilizers are rapidly increasing in most of the States of the Union because of the reduced cost of applying fertilizer of this type to soil. Since the fertilizer is fluid, it can be transferred by pumping through pipes and can be sprayed on the soil through nozzles, thereby reducing the amount of labor involved in the application. Other advantages that result from use of the liquid fertilizer include elimination of the cost of evaporating water to produce solid fertilizers and elimination of all difficulties due to segregation and caking. The latter disadvantages are associated with substantially all processes for the production of solid fertilizer.

A major disadvantage of liquid fertilizers as compared to solid products is that the solid products can be made in more concentrated form. The water used as solvent in making liquid fertilizers acts as a diluent and lowers the grade undesirably. It also adds to the shipping weight and increases transportation costs. The lower grade of solution-type fertilizers and their excess weight per unit of plant food become more disadvantageous from year to year as the general average analysis of solid fertilizers continually increases.

It is an object of this invention to provide a process for the manufacture of improved high-analysis fluid fertilizers which retain the advantage of fluid form while eliminating the disadvantage of low analysis.

Another object is to provide a process for the production of a stable suspension of one or more solid fertilizer salts in a saturated aqueous solution of the same salts.

Another object is to provide a process for the manufacture of substantially nonsettling suspensions of fertilizer salts having good flow properties and acceptable viscosity.

Still another object is to provide such process which may be operated either batchwise or continuously using equipment commonly present in existing fertilizer plants.

Another object is to provide improved, concentrated fluid fertilizers.

In the present invention the products are suspensions of fine crystals of one or more fertilizer salts in saturated aqueous solution of the same salts. A small amount of a nucleating agent, which may be attapulgite, bentonite, or other clays also is present. Less than 5 percent of nucleating agent is required. Usually from 1 to 2 percent is necessary for best results, but with some formulations less than 1 percent is required.

These suspensions are stable, substantially nonsettling, have high plant-food content, good flow properties, and low viscosity.

These products are prepared by forming a supersaturated solution of ammonium phosphate containing a small amount of a nucleating reagent. These supersaturated solutions also may contain such supplemental salts as ammonium nitrate, urea, potassium chloride as are required to give the fertilizer-nutrient ratio desired. The water content of these solutions is controlled to give the amount necessary for the final plant-nutrient content required.

The presence of the nucleating agent causes excess fertilizer salts to crystallize from supersaturated solution in the form of very fine crystals, which remain suspended in a saturated solution of the same salts. The best suspensions are obtained when the amount of water is limited to such degree that at least one-third of the total plant nutrient will be in suspended phase. The reason for this is not clear. However, fertilizers of much better physical properties are obtained consistently when the suspended phase contains over one-third of the total plant nutrients as compared to suspensions in which only one-fourth of total plant nutrients are present as suspended solids.

Preferably, the supersaturated solution of ammonium phosphate is prepared by ammoniating strong phosphoric acid. The concentrated phosphoric acid used for ammoniation should be of sufficient strength that some pyrophosphoric acid is present in it. By a combination of these process steps, suspensions of high analysis, good flow properties, acceptable viscosity, and good stability are prepared.

In preparing the suspensions the water may be added to the neutralization vessel first, or it may be added concurrently with ammonia or with phosphoric acid. Also, either batch or continuous ammoniation may be employed. The nucleation agent preferably is added at a time such that it is present when the salts start crystallizing from solution in order that it may exert its full effect in causing rapid nucleation of the crystallizing salts with the result that very large numbers of very small, easily suspendible crystals are produced rather than a smaller number of large crystals. The nucleating agent, however, will have a beneficial effect even if it is added after the excess salts over and above the amount that will remain in solution have crystallized. During ambient changes in temperature, the salts alternately dissolve and recrystallize. The presence of the nucleation agent prevents the recrystallizing salts from forming hard masses of crystals that would cause settling and segregation of the nutrient and interfere with application to the soil.

It is very desirable to have all the salts in solution at one stage of the process so that the nucleation agent can exert its full effect. This is accomplished most easily by adding the salts before ammoniation of the acid so that the heat of the neutralization reaction will raise the temperature of the mixture high enough to dissolve all salts. However, salts can be added during neutralization of the acid or even afterward, if added immediately before the neutralized solution has cooled. Addition before neutralization has the advantage that more of the heat of reaction goes to supply heat of solution for the salt rather than for evaporating water.

The phosphoric acid used may be any of the types available. However, the nucleation agent performs best when a part of the phosphate is present as pyrophosphoric acid. A preferred form of phosphoric acid for use in our process is acid which has been concentrated to a $P_2O_5$ content above that for 100 percent orthophosphoric acid (72.4 percent $P_2O_5$). At phosphoric acid strength above 72.4 percent $P_2O_5$ a considerable proportion of pyrophosphoric acid is present. A convenient concentration for the phosphoric acid used is about 76 percent $P_2O_5$. At this concentration the acid is fluid and relatively easy to handle, whereas at lower or higher concentrations the acid tends to crystallize at ambient temperatures. However, such concentrations can be used by keeping the acid at elevated temperature during handling and neutralization.

The nucleation agent may be any one of several very finely divided inert materials. Examples of these are clays, dolomites, and other naturally occurring mineral materials. One particular type of clay—attapulgite—has been found to give unexpectedly superior results, especially in combination with highly concentrated phosphoric acid having a $P_2O_5$ content above 72.4 percent. Attapulgite is a hydrated magnesium silicate, commonly known as attapulgus fuller's earth. The amount of nucleation agent required depends mainly on the formulation. Not more than 2 percent usually is required.

By use of these materials and process steps described above, a fluid fertilizer is produced which has good handling properties and a plant-food content much higher than the usual fertilizer solution. If these steps were not used, the excess salts would crystallize as heavy masses that would settle to the bottom or stick to the sides of containers and thereby make the product unusable. The accompanying drawing shows diagrammatically one process for the manufacture of fluid, suspension-type fertilizers having the properties described above.

In the particular embodiment illustrated, water and phosphoric acid from sources not shown are introduced via lines 1 and 2, respectively, into a mixing vessel 4. A controlled quantity of nucleating agent is introduced via line 3 with the water. Ammonia from a source not shown is introduced via line 5 and a perforated spider 6 located in the bottom of vessel 4. Vessel 4 is equipped with a motor-driven stirrer 7. Urea, ammonium nitrate, potassium chloride, or any other solid salts desired are introduced as shown at 8. The process may be operated either batchwise or continuously. For continuous operation the introduction of water, nucleating agent, phosphoric acid, ammonia, and other fertilizer salts if required, is substantially continuous. Rapid agitation by means of stirrer 7 is maintained, and the acid is ammoniated to form a supersaturated solution of ammonium phosphate. As the tank is filled, the reaction is completed and can then be maintained at steady state by controlled introduction of the reactants. The finished suspension is continuously withdrawn via line 9 to storage or use as desired.

When batchwise operation is desired, water may be added to the mixing vessel 4 first, or it may be added concurrently with ammonia and phosphoric acid. The nucleation agent is added at any time such that it is present when the salt starts crystallizing from solution. A supersaturated solution of ammonium phosphate is formed and, in the presence of the nucleating agent, the fertilizer salts crystallize in the form of extremely fine crystals suspended in a saturated aqueous solution of the same salt. Ammoniation of acid is continued until the desired degree of neutralization has been obtained. The mixing vessel is then emptied in any manner desired.

The process steps for the preparation of such fertilizers are therefore very simple and can be carried out in the simplest type of equipment. Equipment and labor costs are very low in a process of this type, and the process does not require skilled labor for its operation.

The following example shows typical results that have been obtained in carrying out this process.

*Example*

Suspensions were prepared by adding ingredients in the following order: nucleation agent, water, phosphoric acid, ammonium nitrate, potassium chloride, and anhydrous ammonia. The mixtures were agitated with a high-shear mixer throughout the preparation. The reaction temperature, near 212° F., caused some evaporation of water. The final weight was adjusted with water to obtain the desired grade. The products were cooled and were then evaluated in three ways: (1) Samples were inspected for pour characteristics after storage for 1 week at 32° F., (2) the apparent viscosity was measured with a Brookfield viscometer at 100 r.p.m., and (3) suspension volume (percent of total depth as suspension layer) was determined after standing for 1 week at room temperature.

A series of tests were set up to determine the quantitative effect of the factors which had been found to give good suspensions. The test program was designed on a statistical basis in order to identify any interactions between the factors. Typical results were as follows.

| Conditions | | | | Properties | | |
|---|---|---|---|---|---|---|
| Acid source [1] | Nucleation agent | | Fertilizer grade | Pour properties [3] | Apparent viscosity, centipoise | Suspension volume |
| | Kind [2] | Percent added | | | | |
| 1:3:3 nutrient ratio: | | | | | | |
| SA | B | 2 | 4-12-12 | 3 | 106 | 100 |
| WA | A | 2 | 4-12-12 | 2 | 75 | 96 |
| WA | B | 2 | 5-15-15 | 1 | 405 | 99 |
| SA | A | 2 | 5-15-15 | 1 | 105 | 95 |
| 1:1:1 nutrient ratio: | | | | | | |
| SA | B | 1 | 12-12-12 | 1 | 124 | 67 |
| WA | A | 1 | 12-12-12 | 2 (thixotropic) | 122 | 87 |
| WA | B | 1 | 14-14-14 | 3 | 2,260 | 100 |
| SA | A | 1 | 14-14-14 | 1 | 445 | 97 |

[1] WA=wet-process acid (55.4 percent $P_2O_5$); SA=highly concentrated furnace acid (76 percent $P_2O_5$).
[2] A=attapulgite; B=bentonite.
[3] 1=good; 2=fair; 3=poor.

The results of the series of tests show that the highly concentrated electric-furnace acid gave better pour properties than wet-process acid after standing at 32° F. for 1 week, especially for the 1:1:1 nutrient ratio. They also show that bentonite used as nucleation agent increases the viscosity of the resulting suspension much more than attapulgite. The combination of wet-process acid and bentonite should not be used when storage for some time at low temperatures is to be used and maximum flow characteristics are desired, especially with 14-14-14 grade. Best pour characteristics after such storage are attained by use of highly concentrated electric-furnace acid and attapulgite, although wet-process acid and bentonite are satisfactory with many grades and for use within a short time after manufacture.

The suspensions containing attapulgite clay were only about one-fourth as viscous as those containing the bentonite clay. For the 1:3:3 nutrient ratio, much better results were obtained for 5-15-15 grade than for the 4-12-12 grade. The saturated solution for this ratio corresponds to a 3-9-9 grade. Therefore, the 5-15-15 grade contained 40 percent of the total nutrients in the suspended phase while the 4-12-12 grade had only 25 percent suspended. For the 1:1:1 ratio, both grades tested carried one-half or more of the total nutrients as suspended solids.

We claim as our invention:

1. The process of producing an improved high-analysis, stable, suspension-type fertilizer having high plant-food content, desirable flow properties, and low viscosity, which comprises the steps of reacting ammoniating fluid and phosphoric acid at a temperature substantially above 20° C.; controlling the water content of said ammoniating fluid and phosphoric acid to effect a supersaturated solution during a later-mentioned cooling step; mixing in the resulting solution an impalpable clay material selected from the group consisting of attapulgite and bentonite, in quantity sufficient to furnish about 1 to 5 percent of said impalpable material in the fertilizer to be produced; rapidly cooling the resulting material to about 20° C. to effect the formation of minute crystals of the resulting fertilizer salts in a saturated aqueous solution of the same salts, whereby the numerous particles of said impalpable material acts as the nuclei of said minute crystals; and withdrawing the resulting stable suspension as product.

2. The process of producing an improved high-analysis, stable, suspension-type fertilizer having high plant-food content, desirable flow properties, and low viscosity, which comprises the steps of reacting ammoniating fluid and phosphoric acid at a temperature substantially above 20° C.; controlling the water content of said ammoniating fluid and phosphoric acid to effect a supersaturated solution during a later-mentioned cooling step; mixing in the resulting solution an impalpable clay material selected from the group consisting of attapulgite and bentonite, in quantity sufficient to furnish about 1 to 5 percent of said impalpable material in the fertilizer to be produced; rapidly cooling the resulting material to about 20° C. to effect the formation of minute crystals of the resulting fertilizer salts in a saturated aqueous solution of the same salts, whereby the numerous particles of said impalpable material act as the nuclei for said minute crystals; withdrawing the resulting stable suspension as product; and said process being characterized by the fact that at least one-third of the total quantity of fertilizer material is present in the form of said minute crystals in said suspension.

3. The process of producing an improved high-analysis, stable, suspension-type fertilizer having high plant-food content, desirable flow properties, and low viscosity, which comprises the steps of reacting ammoniating fluid and phosphoric acid at a temperature substantially above 20° C.; controlling the water content of said ammoniating fluid and phosphoric acid to effect a supersaturated solution during a later-mentioned cooling step; mixing in the resulting solution an impalpable clay material selected from the group consisting of attapulgite and bentonite, in quantity sufficient to furnish about 1 to 5 percent of said impalpable material in the fertilizer to be produced; mixing in the resulting solution additional fertilizer material selected from the group consisting of ammonium nitrate, urea, ammonium chloride, potassium chloride, and potassium nitrate; rapidly cooling the resulting material to about 20° C. to effect the formation of minute crystals of the resulting fertilizer salts in a saturated aqueous solution of the said salts, whereby the numerous particles of said impalpable material act as the nuclei for said minute crystals; withdrawing the resulting stable suspension as product; and said process being characterized by the fact that at least one-third of the total quantity of fertilizer material is present in the form of said crystals in said suspension.

4. The process of claim 1, which process is further characterized by the fact that the product has a suspension volume greater than about 70.

References Cited in the file of this patent

UNITED STATES PATENTS

| | | |
|---|---|---|
| 2,324,079 | Greger | July 13, 1943 |
| 2,683,658 | Saunders et al. | July 13, 1954 |
| 2,770,538 | Vierling | Nov. 13, 1956 |
| 2,792,286 | Wordie et al. | May 14, 1957 |
| 2,798,801 | Kieffer et al. | July 9, 1957 |
| 2,893,858 | MacDonald et al. | July 7, 1959 |
| 2,926,079 | Smith | Feb. 23, 1960 |
| 2,971,292 | Malecki | Feb. 14, 1961 |

OTHER REFERENCES

Gregory: Uses and Applications of Chemicals and Related Materials, Reinhold Publishing Corp., 1939 (pages 85–87 specifically).